United States Patent

[11] 3,591,854

[72] Inventor Charles N. Cole
Daytona Beach, Fla.
[21] Appl. No. 787,833
[22] Filed Dec. 30, 1968
[45] Patented July 6, 1971
[73] Assignee General Electric Company

[54] SIGNAL PHASE AND MAGNITUDE MEASUREMENT CIRCUIT
5 Claims, 2 Drawing Figs.

[52] U.S. Cl. .......... 307/232, 307/235, 307/251, 307/295, 307/313, 324/83, 328/133
[51] Int. Cl. .......... H03k 5/20
[50] Field of Search .......... 307/229, 231, 232, 233, 235, 238, 251, 255, 288, 293, 295, 304, 313; 328/133, 155; 324/83 A, 83 Q, 68 A

[56] References Cited
UNITED STATES PATENTS

| | | | |
|---|---|---|---|
| 2,900,506 | 8/1959 | Whetter | 307/232 |
| 2,901,612 | 8/1959 | Dwork et al. | 307/232 X |
| 3,246,241 | 4/1966 | Colby, Jr. | 324/83 (A) |
| 3,317,756 | 5/1967 | Laporte | 307/229 |
| 3,489,919 | 1/1970 | Wolterman | 307/235 X |
| 3,502,905 | 3/1970 | Bicking | 307/235 |
| 3,509,372 | 4/1970 | Bicking | 307/235 X |

*Primary Examiner*—Stanley T. Krawxzewicz
*Attorneys*—Raymond H. Quist, Allen E. Amgott, Henry W. Kaufmann, Melvin M. Goldenberg, Frank L. Neuhauser and Oscar B. Waddell

ABSTRACT: A known reference signal is gated through N and P field effect transistors in a push-pull configuration by a measured signal of the same frequency but approximately 90° out of phase to a pair of capacitors across the transistors. The capacitors acquire a charge proportional to the deviation from 90° which is applied to a differential amplifier. If both signals are in phase and the reference is used as the gating signal, an output proportional to the magnitude of the measured signal is achieved.

PATENTED JUL 6 1971 3,591,854

INVENTOR.
Charles N. Cole
BY
ATTORNEY.

SIGNAL PHASE AND MAGNITUDE MEASUREMENT CIRCUIT

BACKGROUND OF THE INVENTION

This invention relates generally to signal measurement, and more particularly to phase detection and signal magnitude measurement.

Although many prior art devices have been developed to perform measurements of the types made by this invention, they do not lend themselves to microcircuit techniques by virtue of their using transformers, for example. In addition, such prior art circuits are designed to perform phase detection or provide signal magnitude information, but not both.

SUMMARY OF THE INVENTION

It is an object of this invention to provide, in a form suitable for fabrication by microcircuit techniques, a circuit which can be used either for phase detection or signal magnitude measurement.

In a preferred form of the invention, an alternating reference signal is applied to the gate electrodes of a pair of enhancement mode field effect transistors, one being N-type and the other P-type so that one transistor will be placed in conducting state during the first half-cycle of the reference signal and the other during the second half-cycle. An alternating measured signal of the same frequency as the reference signal being compared with the reference signal is applied to a pair of the channel electrodes of the transistors; however, the measured signal is approximately 90° out of phase with the reference signal. The other channel electrodes of the transistors are connected through resistors to the input terminals of a differential amplifier. A pair of series connected capacitors, with a ground connection between them, is shunted across the amplifier. In the event the two signals are not 90° out of phase, the capacitors acquire a charge proportional to the additional phase difference. This charge results in an output of the amplifier which can be interpreted to derive the additional phase difference angle.

If the two signals are in phase, but with the measured signal applied to the channel electrodes and the reference signal applied to the gate electrodes an output proportional to the amplitude of the measured signal's voltage is produced by the amplifier.

DESCRIPTION OF THE PREFERRED EMBODIMENT

The basic circuit of this invention can be used to determine the frequency variations of a signal about a nominal frequency. In addition, it can be employed when information about the magnitude of a signal is required.

Figure 1:
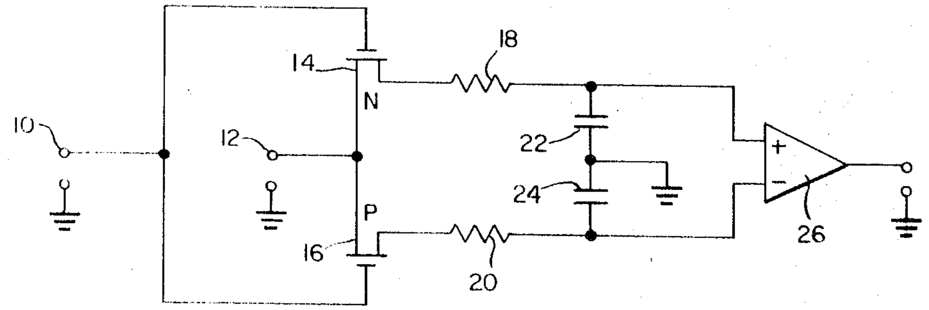

Referring to FIG. 1, a first pair of input terminals 10, and a second pair of input terminals 12 are provided. Terminals 10 are connected to the gate electrodes of enhancement mode field effect transistors 14 and 16, while terminals 12 are connected to one channel electrode of each of these field effect transistors. The other channel electrodes of field effect transistors 14 and 16 are connected to one terminal of resistors 18 and 20 respectively.

Integrating capacitors 22 and 24 are connected respectively to the other terminals of resistors 18 and 20 and to ground, forming filter networks. The input terminals of a high impedance differential amplifier 26 are also connected to the other terminals of resistors 18 and 20.

The invention contemplates the use of an alternating reference signal, the frequency of which is known, and a measured signal, which is to be compared with the reference signal. In the application of this circuit to the detection of differences of phase between the two signals, either the reference signal or the measured signal can be applied to terminals 10. For the purposes of this description the measured signal will be applied to terminals 10.

Field effect transistors 14 and 16 are chosen to be of opposite types; i.e., 14 is an N-type and 16 is a P-type, so that one will conduct during positive half-cycles of the measured signal and the other during negative half-cycles.

Figure 2:
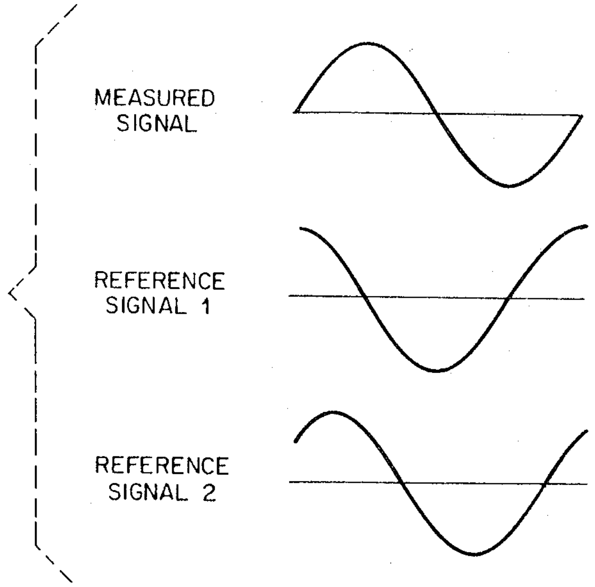

As illustrated in FIG. 2, for this application the reference signal is 90° out of phase with the measured signal. During the positive half-cycle of the measured signal, field effect transistor 14 is placed in its conducting state causing capacitor 22 first to become charged by the positive quarter cycle of the reference signal (Reference Signal 1 in FIG. 2), and then become discharged during the next quarter cycle. At this point field effect transistor 16 is placed in its conducting state by the negative half-cycle of the measured signal. Capacitor 24 thus is charged during the third quarter cycle of the reference signal and discharged during the fourth quarter cycle. Since the measured signal is precisely 90° out of phase with the reference signal no output from differential amplifier 26 results.

If there is some deviation from the 90° phase difference a different result is obtained. Consider Reference Signal 2 in FIG. 2 in comparison with the Measured Signal illustrated. During the first half-cycle of the measured signal, capacitor 22 has a longer charging than discharging cycle leaving it with a net positive charge. In a similar manner, capacitor 24 will be left with a net negative charge at the end of the second half-cycle of the measured signal. Differential amplifier 26 produces an output which is proportional to the phase difference between the two signals. This output can be used solely as measurement information or, depending upon the application of the circuit, to adjust the reference signal to be precisely 90° out of phase through the use of a suitable feedback circuit.

At times it is desired to obtain information relating to the amplitude of the measured signal. In order to obtain such information the circuit of FIG. 1 is employed in a slightly different manner. The measured signal in this case must be applied to terminals 12, while the reference signal is applied to terminals 10. Also, the reference signal is made to be in phase with the measured signal.

If the measured signal and reference signal are in phase, the following results obtain. During positive half-cycles of the signals, field effect transistor 14 is placed in its conducting state. Capacitor 22 becomes charged over several cycles to a positive voltage proportional to the area of the measured signal positive half-cycle waveform.

In a similar manner during negative half-cycles, field effect transistor 16 conducts. Capacitor 24 thereby acquires a negative charge over several cycles proportional to the area of the measured signal negative half-cycle voltage waveform. Differential amplifier 26 produces an output voltage proportional to the difference in the voltages of capacitors 22 and 24, and therefore to the magnitude of the measured signal.

I claim:

1. A signal measurement circuit for comparing two alternating signals of the same frequency comprising:
   - a pair of field effect transistors of opposite conductivity types each having a gate electrode and two channel electrodes;
   - a first set of input terminals for receiving one of said two signals connected to the gate electrodes of said transistors, whereby one of said transistors will be caused to conduct during positive portions of said one signal, and the other during negative portions of said one signal;
   - a second set of input terminals for receiving the other of said two signal connected to one channel electrode of each of said transistors; and
   - charge storage means coupled to each of said transistors for storing any net charge due to the conducting by the associated transistor of a portion of the other of said two signals while in its conductive state.

2. A signal measurement circuit in accordance with claim 1 further comprising:

a differential amplifier connected to said charge storage means and adapted to produce an output signal proportional to the total charge contained in said charge storage means.

3. A signal measurement circuit in accordance with claim 2 wherein said charge storage means comprises:

a pair of capacitors connected in series across the input terminals of said differential amplifier and having a ground connection between them.

4. A signal measurement circuit in accordance with claim 3 wherein:

said one signal is a reference signal and said other signal is a measured signal.

5. A signal measurement circuit for comparing a reference alternating signal and a measured alternating signal of the same frequency comprising:

a first field effect transistor of N-type;

a second field effect transistor of P-type;

a first set of input terminals for receiving one of said signals which is connected to the gates of said first and second field effect transistors;

a second set of input terminals for receiving the other of said signals which is connected to one channel electrode of said first and second field effect transistor;

a differential amplifier having two input terminals and one output terminal;

the other channel electrodes of said first and second field effect transistors being connected to the input terminals of said differential amplifier through resistors; and a pair of integrating capacitors connected in series across the input terminals of said differential amplifier and having a connection to ground between them.